Patented Oct. 26, 1937

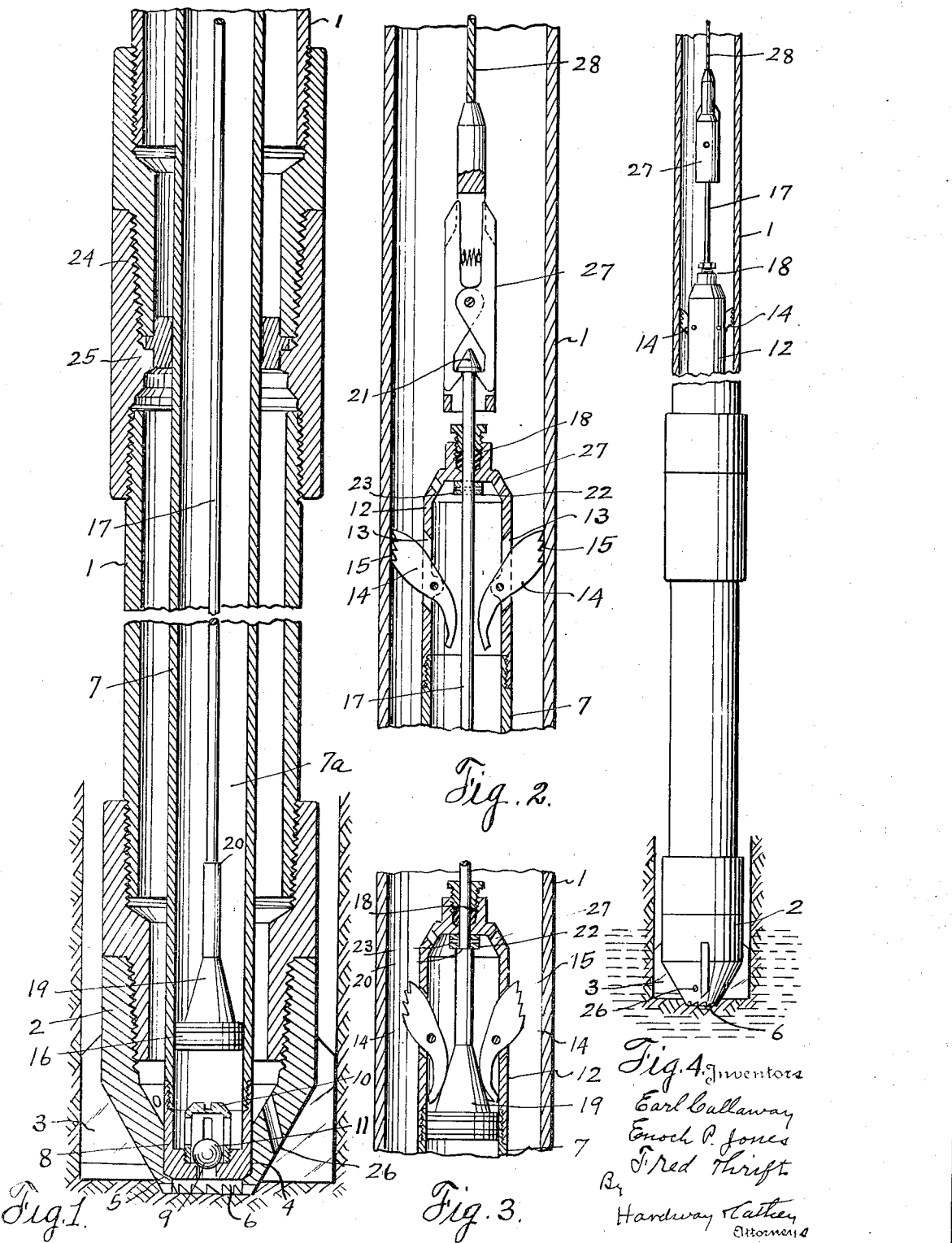

2,096,783

UNITED STATES PATENT OFFICE 2,096,783

APPARATUS FOR TESTING WELLS

Earl Callaway and Enoch P. Jones, Houston, and Fred Thrift, San Antonio, Tex.

Application June 22, 1936, Serial No. 86,526

2 Claims. (Cl. 166—1)

This invention relates to an apparatus for testing wells.

An object of the invention is to provide a novel type of apparatus for testing the content of formation encountered in drilling wells and also comprehends the method employed in making such tests.

Another object of the invention is to provide well testing apparatus that may be readily lowered through the drill stem and anchored therein in position for taking a sample of the formation to be tested and includes means whereby the formation may be subjected to suction created by a partial vacuum in the sample chamber in the testing apparatus and embodies also means for creating the vacuum, for entrapping the sample in the chamber and for releasing and withdrawing the apparatus with the entrapped sample through the drill stem from the well.

The invention contemplates a testing tool adapted to be used with the conventional type of drill stem and drill such as is commonly used in drilling and coring a well, and is of such construction that it may be dropped through the drill stem and landed in home position for making the test by gravity and withdrawn, when a sample is entrapped, by means of a wire line and conventional grappling tool commonly used for similar purposes.

It is a prime object of the invention to provide a testing tool that may be lowered into home position in the drilling apparatus and which is provided with a sample receiving chamber with means for creating a vacuum or partial vacuum in the chamber to induce the inflow of liquid from the formation into said chamber with means for entrapping the sample in the chamber while the tool is being withdrawn to the ground surface for inspection of the sample.

The invention also includes the method of entrapping and removing a sample from formation encountered in the drilling of a well which method comprises the lowering of a testing tool, having a sample receiving chamber, into home position in a well drilling apparatus having a sample receiving inlet which is sealed from the inflow of drilling fluid in the well bore, creating a vacuum or partial vacuum in the sample receiving chamber to induce the inflow of a sample of the formation content into said chamber, entrapping said sample in the chamber and withdrawing the testing tool and entrapped sample through the drill stem to the ground surface for an inspection of the sample.

With the above and other objects in view the invention has particular relation to certain novel features of construction, operation and arrangement of parts, and to a novel method, an example of which is described in this specification and illustrated in the accompanying drawing, wherein:—

Figure 1 shows a vertical sectional view of the lower end of the drilling apparatus and testing tool located in home position therein.

Figure 2 shows a vertical sectional view of the drill stem showing the upper portion of the testing tool anchored to the stem.

Figure 3 shows a fragmentary vertical sectional view, showing the anchoring means released for the withdrawal of the testing tool, and Figure 4 shows a side view of the drilling apparatus partly in section showing also the testing tool anchored therein with means for withdrawing the tool from the drilling apparatus.

Referring now more particularly to the drawing wherein like numerals of reference designate the same parts in each of the five figures, the numeral 1 designates a drill stem to the lower end of which the drill 2 is attached. Any conventional type of drill may be employed which has a sample receiving inlet. The type shown, for illustration, is equipped with the side cutting blades 3 and is provided with a central bore 4 whose lower end is slightly contracted forming the inside seat 5. The lower end of the drill is preferably provided with the cutting teeth 6 around the bore 4. This general type of drill is preferably used for the reason that it may be also used for taking cores when used with a core taking device such as is adapted to be used in combination therewith for engaging and removing the cores formed by the drill.

The testing apparatus or tool to be used in combination with the drilling apparatus hereinabove described comprises a main barrel 7 which is preferably cylindrical in form and which may be of any length practical and which contains the sample receiving chamber 7a.

Screwed on to the lower end of the barrel there is a valve casing 8, shaped to fit closely within the bore 4 and whose lower end is tapered and shaped to conform to the shape of and to form a close fit with the seat 5 and the lower end of the casing has a restricted inlet 9 for the inlet of the sample within the valve casing and within the casing threaded into the lower end thereof around the inlet 9, there is the valve cage 10. An upwardly opening valve 11 is confined by said cage and controls the inlet 9.

Screwed onto the upper end of the barrel 7 there is the hood 12 having the side slots 13, 13 through which the dogs 14, 14 extend. These dogs are pivoted to the hood 12 and their outer ends are formed with the upwardly and outwardly pitched teeth 15 to engage the drill stem. Their inner ends are downwardly and outwardly curved and are overbalanced by the outer ends so that the teeth will be held by gravity in engaging position. Fitted within the barrel 7 there is a piston 16 and a piston rod 17 is fitted through a stuffing box 18 at the upper end of the hood 12 and its lower end is attached to the piston 16. The lower end of the piston rod 17 terminates in an enlarged upwardly tapering mandrel and the piston rod is reduced forming an external annular upwardly facing shoulder 20 thereon. The upper end of the piston rod is provided with an enlarged conical shaped head 21 for a purpose to be hereinafter stated.

The rod 17 is of such length that when the testing apparatus is in position to make the test the piston 16 will be adjacent the lower end of the barrel. It is maintained in this position while being lowered into home position in the drilling apparatus by means of a collar 22 within the head and which is pinned on the rod 17 by a pin 23, said collar abutting the upper end of the hood.

Before the testing tool is lowered into the drilling apparatus, drilling operations may be carried on in the usual way and cores of the formation being pierced may be taken from time to time as desired by means of a core taker of a construction to be lowered into and withdrawn from the drilling apparatus; or the central portion of the formation may be removed by means of a center drill which may be anchored in the main drill 2.

When it is desired to make a test of a formation encountered, the coring device, or center drill, if used, may be withdrawn through the drill and the testing apparatus hereinabove described may be lowered by gravity through the drill stem from the ground surface and the valve casing 8 will enter the bore 4 and land on the seat 5.

Incorporated into the drill stem there is an inwardly thickened tool joint 24 connecting adjacent sections of the stem and clamped between the pin and box of the tool joint there is an annular gland 25 forming a guide through which the barrel 7 fits loosely. The dogs 14 will not interfere with the downward movement of the testing apparatus, but when it lands in home position the teeth 15 will fall into engaging position with relation to the drill stem and will engage said stem to hold the testing tool in said home position.

The drill 2 has the outlet channels 26 through which the drilling fluid forced down through the drill stem during drilling or coring operations may be supplied to the drill to carry away the cuttings. However, it will be noted that the lower end of the drill 2 forms a seal with the formation around the inlet 9 so as to prevent the inlet of drilling fluid from the well bore into the sample chamber 7a when a test is being made.

For the purpose of lowering the testing tool a grapple 28 may be engaged over the head 21 and the testing tool then lowered through by gravity. When the testing tool has landed in home position, an upward pull is exerted on the cable 28 by means of a suitable appliance at the ground surface and the barrel 7 being anchored against upward movement the pin 23 will be sheared and the piston rod 17 and the piston 16 will be moved upwardly through the barrel 7 thereby creating a vacuum beneath the piston and drawing in a sample, by suction, of the liquid content of the formation to be tested. The valve 11 will lift to permit the inlet of said sample but will thereafter close to entrap the admitted sample. Upon continued upward movement of the rod 17 the shoulder 20 will engage the collar 22 which in turn will engage the upper end of the hood 12 and simultaneously the mandrel 19 will wedge between the inner ends of the dogs 14, as shown in Figure 3, retracting the outer ends of said dogs and releasing them from the stem 1 and thereupon the testing tool with the entrapped sample therein may be withdrawn to the ground surface for an inspection of the sample.

It may be noted that in addition to the slots 13 the upper end of the hood 12 is also provided with ports 27 to permit the inlet of liquid into the barrel above the piston 16 to permit equalization of pressures on opposite sides of the piston while the testing tool is being lowered and to permit the outlet of liquid above the piston while the piston is being elevated through the barrel.

The drawing and description disclose what is now considered to be a preferred form of the invention by way of illustration while the broad principle of the invention will be defined by the appended claims.

What we claim is:—

1. Apparatus for testing the formation in a well comprising a tubular drill stem, a drill on the lower end of the stem having an opening provided with a seat, a testing tool shaped to be lowered through the stem and whose lower end is formed to enter the bore and land on the seat, said testing tool having a sample receiving chamber and being provided with an inlet, means for anchoring the testing tool in home position in the drill stem, means for creating a vacuum in the chamber to induce the inflow of liquid from the formation into the chamber, means for entrapping the liquid in the chamber and for releasing the anchoring means and means for withdrawing the testing tool through said stem to the ground surface.

2. In combination a tubular drill stem, a drill on the lower end thereof having a vertical bore and an inside seat in the bore, a tubular barrel in the stem whose lower end rests on the seat and is provided with a valve controlled inlet, releasable stem engaging means on the barrel, a piston in the barrel, a flexible line connected to the piston whereby the piston may be moved upwardly in the barrel and means for releasing the engaging means upon upward movement of the piston to permit the barrel to be elevated, by the line, from the drill stem.

EARL CALLAWAY.
ENOCH P. JONES.
FRED THRIFT.